United States Patent
Jamadagni et al.

(10) Patent No.: US 12,549,452 B2
(45) Date of Patent: Feb. 10, 2026

(54) SYSTEM AND METHOD FOR DETECTING AND HANDLING MACHINE EMERGENCIES IN A NETWORK

(71) Applicant: JIO PLATFORMS LIMITED, Ahmedabad (IN)

(72) Inventors: Satish Nanjunda Swamy Jamadagni, Bangalore (IN); Mathew Oommen, Mumbai (IN); Pradeep Krishnamurthy Hirisave, Bangalore (IN); Vinay Shrivastava, Bangalore (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 358 days.

(21) Appl. No.: 18/028,553

(22) PCT Filed: Sep. 28, 2022

(86) PCT No.: PCT/IB2022/059230
§ 371 (c)(1),
(2) Date: Mar. 26, 2023

(87) PCT Pub. No.: WO2023/053025
PCT Pub. Date: Apr. 6, 2023

(65) Prior Publication Data
US 2024/0356812 A1    Oct. 24, 2024

(30) Foreign Application Priority Data
Sep. 28, 2021   (IN) .............................. 202121043964

(51) Int. Cl.
*H04L 41/16* (2022.01)
*H04W 4/90* (2018.01)
*H04W 28/02* (2009.01)

(52) U.S. Cl.
CPC ............... *H04L 41/16* (2013.01); *H04W 4/90* (2018.02); *H04W 28/0268* (2013.01)

(58) Field of Classification Search
CPC .......... G06N 3/02; G06N 3/042; G06N 3/044; G06N 3/0442; G06N 3/045; G06N 3/0455;
(Continued)

(56) References Cited

U.S. PATENT DOCUMENTS 10,599,982 B2 *   3/2020  Pal .......................... H04L 67/12
12,273,748 B2 *   4/2025  Eleftheriadis ......... H04L 41/142
(Continued)

FOREIGN PATENT DOCUMENTS

WO        2020168321 A1     8/2020

OTHER PUBLICATIONS

ETSI, "IP Multimedia Subsystem (IMS) emergency sessions", (3GPP TS 23.167 version 15.2.0 Release 15), 2018, Sophia Antipolis Cedex, France, Total pp. 66.
(Continued)

*Primary Examiner* — Frank Duong
(74) *Attorney, Agent, or Firm* — Raj S. Dave; Dave Law Group LLC

(57) ABSTRACT

The present invention provides an efficient and reliable system to identify machine emergency types within a 3GPP network/device such as LTE, 5G, 6G and the like and enrich the emergency messages with appropriate data such as location, machine ID, Plant ID and the like. The system further may provide for a mechanism to identify the appropriate emergency servers that can handle the type of emergency, and redirect the emergency messages to one or more servers along with enriched data. The system may further enable architectural systems that may be needed to handle such emergencies in a time effective manner.

19 Claims, 13 Drawing Sheets

(58) Field of Classification Search
CPC ...... G06N 3/0464; G06N 3/0499; G06N 3/08; G06N 3/088; G06N 3/09; G06N 3/091; G06N 3/092; G06N 20/00; G06N 20/10; H04B 17/3912; H04B 17/3913; H04L 25/0254; H04L 25/03165; H04L 2012/05686; H04L 2025/03464; H04L 41/145; H04L 41/16; H04L 45/08; H04W 4/70; H04W 4/90; H04W 16/22; H04W 24/04; H04W 28/0268
See application file for complete search history.

(56) References Cited

U.S. PATENT DOCUMENTS

| | | |
|---|---|---|
| 2017/0011298 A1 | 1/2017 | Pal et al. |
| 2018/0198641 A1 | 7/2018 | Gilani et al. |
| 2019/0253861 A1* | 8/2019 | Horelik ............... H04W 64/006 |
| 2021/0243839 A1* | 8/2021 | Krishnaswamy ..... H04W 24/04 |
| 2022/0103973 A1 | 3/2022 | Sirotkin et al. |

OTHER PUBLICATIONS

International Search Report, PCT/IB2022/059230, mailed Jan. 6, 2023, Total pp. 03.

* cited by examiner

SYSTEM AND METHOD FOR DETECTING AND HANDLING MACHINE EMERGENCIES IN A NETWORK

CROSS-REFERENCE TO RELATED APPLICATION(S)

This application is a National Stage of International Application No. PCT/IB2022/059230, filed on Sep. 28, 2022, which claims priority to Indian patent application No. 202121043964, filed Sep. 28, 2021, the disclosures of which are hereby incorporated by reference in their entirety.

FIELD OF INVENTION

The embodiments of the present disclosure generally relate to detecting emergencies in a network. More particularly, the present disclosure relates to systems and methods for enabling machine emergency detection and handling the emergency accordingly.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The Internet of things (IoT) describes the network of physical object/"things"—that are embedded with sensors, software, and other technologies for the purpose of connecting and exchanging data with other devices and systems over the Internet. Things have evolved due to the convergence of multiple technologies, real-time analytics, machine learning, ubiquitous computing, commodity sensors, and embedded systems. Traditional fields of embedded systems, wireless sensor networks, control systems, automation (including home and building automation), and others all contribute to enabling the Internet of things. In the consumer market, IoT technology is most synonymous with products pertaining to the concept of the "smart home", including devices and appliances (such as lighting fixtures, thermostats, home security systems and cameras, and other home appliances) that support one or more common ecosystems, and can be controlled via devices associated with that ecosystem, such as smartphones and smart speakers. The IoT can also be used in healthcare systems. There are a number of serious concerns about dangers in the growth of the IoT, especially in the areas of privacy and security, and consequently industry and governmental moves to address these concerns have begun including the development of international standards.

The industrial internet of things (IIoT) refers to the extension and use of the internet of things (IoT) in industrial sectors and applications. With a strong focus on machine-to-machine (M2M) communication, big data, and machine learning, the IIOT enables industries and enterprises to have better efficiency and reliability in their operations. The IIoT encompasses industrial applications, including robotics, medical devices, and software-defined production processes. The IIoT goes beyond the normal consumer devices and internetworking of physical devices usually associated with the IoT. What makes it distinct is the intersection of information technology (IT) and operational technology (OT). OT refers to the networking of operational processes and industrial control systems (ICSs), including human machine interfaces (HMIs), supervisory control and data acquisition (SCADA) systems, distributed control systems (DCSs), and programmable logic controllers (PLCs).

Such a system can help industries to grow tremendously due to the provision of uninterrupted data ubiquitously and helps take better decisions holistically. It also helps in providing data automatically on the health of the overall system. For ex: in a manufacturing plant, sensors put in can help tell us if there are any harmful gas leaks using smoke sensors, or water leaks or machine overload and needs a shutdown etc. Such situations are called Machine emergency in general wherein a real time emergency situation is being conveyed across the system in an automated way. Such data passes via cellular network (over 2G, 3G, 4G or next generation cellular network including NB-IoT as a technology) and reaches the emergency or SCADA or remote-controlled servers via internet. Such emergency sessions are the most fundamental and critical services offered by telecommunications networks. They require preferential treatment over regular sessions, and which is achieved with QoS and resource management techniques. However, the existing 3gpp system or solution only provides preferential treatment to public-initiated emergency communications, whereas it does not offer any special treatment to mission critical calls or in general machine emergency types in a typical IoT or IIOT system.

Handling emergencies in a 3GPP network has so far meant to handle human emergencies. The nature of handling human emergencies is very different from that of handling machine emergencies. The existing emergency definition and handling mechanism in 3GPP caters to human emergencies and does not address machine emergencies. The introduction of IoT and especially IIOT (Industrial IoT) opens numerous types of emergencies that will have to be handled differently from human emergencies. Moreover, it is to be noted that in a Machine type communication, especially where there is no human intervention, it is more important to have a unique identity for subscription like SIM/USIM/eSIM/Soft SIM. Thus, a SIM less operation is strictly not possible in such a situation which otherwise is allowed in regular 3GPP system.

Therefore, there is a need in the art to provide systems and methods that can identify different types of machine emergencies and propose mechanisms to handle such emergencies.

OBJECTS OF THE PRESENT DISCLOSURE

Some of the objects of the present disclosure, which at least one embodiment herein satisfies are as listed herein below.

An object of the present disclosure is to provide a system and method that facilitates SIM less emergency attach for machine type devices.

An object of the present disclosure is to provide a system and method that covers aspects of emergency attach for machine type devices.

An object of the present disclosure is to provide a system and method to identify machine emergency types within a 3GPP network/device (covering LTE, 5G, 6G), enrich the emergency messages with appropriate data such as location, machine ID, Plant ID etc.

An object of the present disclosure is to provide a system and method to identify the appropriate emergency servers that can handle the type of emergency, redirecting the emergency messages to the appropriate servers along with enriched data.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for detecting and handling machine emergencies in a network. The system may include one or more processors operatively coupled with one or more first computing devices, one or more base stations, an Open radio access network (O-RAN) Radio Unit (RU) and a plurality of nodes. The one or more first computing devices, the one or more base stations, the O-RAN RU and the plurality of nodes may be operatively coupled with the network. The one or more processors may be coupled with a memory that stores instructions which when executed by the one or more processors causes the system to receive a first set of data packets pertaining to a plurality of messages from the one or more first computing devices in the network, receive a second set of data packets pertaining to a plurality of messages from the one or more base stations in the network, receive a third set of data packets pertaining to a plurality of messages from the O-RAN RU in the network, receive a fourth set of data packets pertaining to a plurality of messages from a plurality of nodes in the network. The system may be further configured to extract, by using a machine learning (ML) engine associated with the one or more processors, a set of attributes from the first, second, third and fourth set of data packets received, the set of attributes pertaining to one or more emergencies associated with the one or more first computing devices, the one or more base stations, the O-RAN-RU and the plurality of node. The system may be further configured to classify, by the ML engine, the one or more emergencies into a set of predefined classes based on a predefined set of instructions.

In an embodiment, the ML engine may be configured to process and handle the one or more emergencies based on a set of instructions associated with each said predefined class.

In an embodiment, the ML engine may be further configured to define the set of instructions for each said predefined class to handle pre-mapped industry verticals.

In an embodiment, the ML engine may be further configured to cater for a plurality of real time machine type emergencies that occur in one or more IoT applications.

In an embodiment, the ML engine may be further configured to: define, manage and handle one or more new emergency types associated with the one or more first computing devices, the one or more base stations, the O-RAN-RU and the plurality of nodes.

In an embodiment, the ML engine may be further configured to define and categorise the one or more new emergency types as new classes of emergencies.

In an embodiment, the ML engine may be further configured to handle each new emergency type automatically or manually based on the categorization of the one or more new emergency types and a predefined set of instructions associated with the categorization.

In an embodiment, initial bits of the first set of data packets, the second set of data packets, the third set of data packets and the fourth set of data packets indicate an emergency type and rest of the first set of data packets, the second set of data packets, the third set of data packets and the fourth set of data packets indicate packet transfer post the establishment of a machine assembly.

In an embodiment, the ML engine may be further configured to receive a newly defined quality of service to handle one or more emergencies: that is shared in the service request cause, configure and map the new identified QoS profile and/or handle the emergency appropriately and interface and identify the emergency type and the necessary signalling identifiers to let the network know of the right type of QoS profile to identify and apply.

In an embodiment, the ML engine may be further configured to collect data collected meticulously and deposit in a cloud-based data lake to be processed to extract actionable insights.

In an aspect, the present disclosure provides for a user equipment (UE) for detecting and handling machine emergencies in a network. The UE may include one or more processors operatively coupled with one or more base stations, an Open radio access network (O-RAN) Radio Unit (RU) and a plurality of nodes. The one or more base stations, the O-RAN RU and the plurality of nodes may be operatively coupled with the network. The one or more processors may be coupled with a memory that stores instructions which when executed by the one or more processors causes the UE to receive a first set of data packets pertaining to a plurality of messages from the one or more first computing devices in the network, receive a second set of data packets pertaining to a plurality of messages from the one or more base stations in the network, receive a third set of data packets pertaining to a plurality of messages from the O-RAN RU in the network, receive a fourth set of data packets pertaining to a plurality of messages from a plurality of nodes in the network. The UE may be further configured to extract, by using a machine learning (ML) engine associated with the one or more processors, a set of attributes from the first, second, third and fourth set of data packets received, the set of attributes pertaining to one or more emergencies associated with the one or more first computing devices, the one or more base stations, the O-RAN-RU and the plurality of node. The UE may be further configured to classify, by the ML engine, the one or more emergencies into a set of predefined classes based on a predefined set of instructions.

In an aspect, the present disclosure provides for a method for detecting and handling machine emergencies in a network. The method may include the steps of receiving, by one or more processors, a first set of data packets, the first set of data packets pertaining to a plurality of messages from one or more first computing devices in the network. The one or more processors may be operatively coupled with the one or more first computing devices, one or more base stations, an Open radio access network (O-RAN) Radio Unit (RU) and a plurality of nodes. The one or more first computing devices, the one or more base stations, the O-RAN RU and the plurality of nodes may be operatively coupled with the network. Further, the one or more processors may be coupled with a memory that stores instructions. The method may also include the steps of receiving, by the one or more processors, a second set of data packets pertaining to a plurality of messages from one or more base stations in the network, receiving, by the one or more processors, a third set of data packets, the third set of data packets pertaining to a plurality of messages from the Open radio access network (O-RAN) Radio Unit (RU) in the network, and receiving, by the one or more processors, a fourth set of data packets, the fourth set of data packets pertaining to the plurality of messages from a plurality of nodes in the network. The method may further include the step of extracting, by an machine learning (ML) engine associated with the one or more processors, a set of attributes from the first, second, third and fourth set of data packets received, the set of attributes pertaining to one or more emergencies associated with the one or more first computing devices, the one or more base stations, the O-RAN-RU and the plurality of nodes. Furthermore, the method may include the step of classifying, by the ML engine, the one or more emergencies into a set of predefined classes based on a predefined set of instructions.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides an efficient and reliable systems to identify machine emergency types within a 3GPP network/device such as LTE, 5G, 6G and the like and enrich the emergency messages with appropriate data such as location, machine ID. Plant ID and the like. The system further may provide for a mechanism to identify the appropriate emergency servers that can handle the type of emergency, and redirect the emergency messages to one or more servers along with enriched data.

Figure 1:
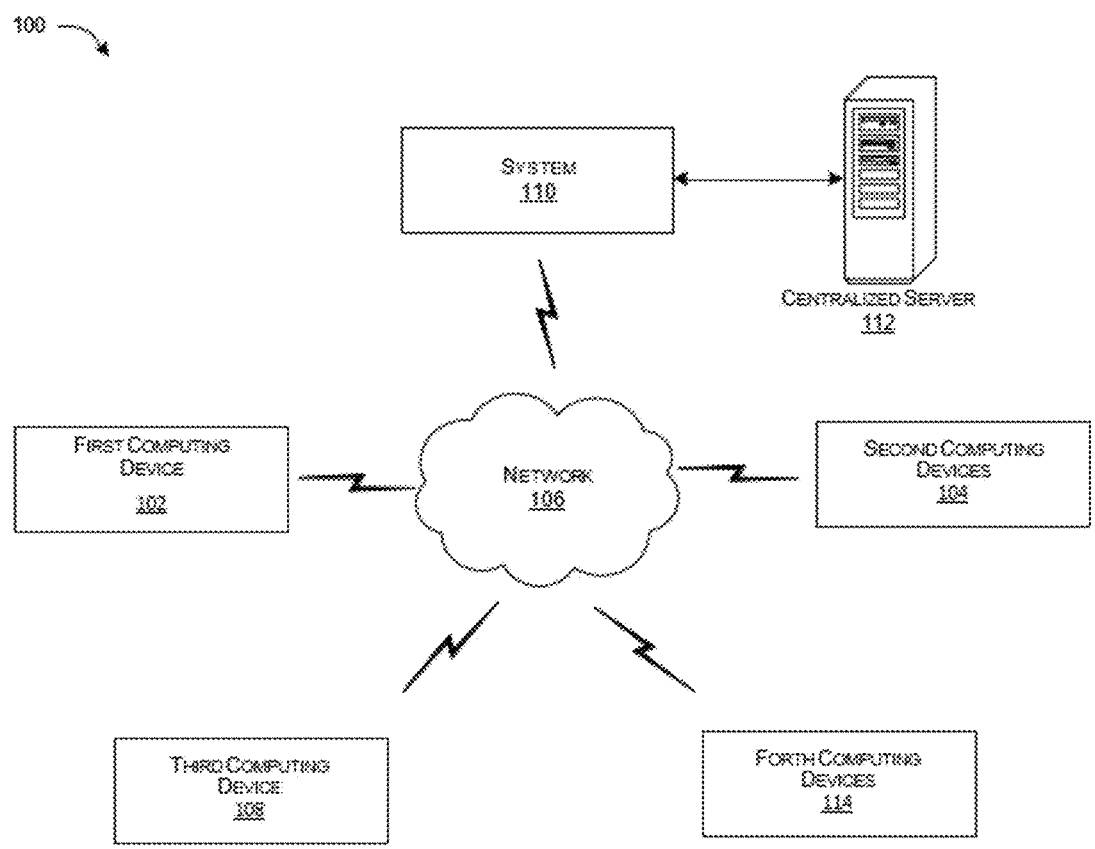
FIG. 1 illustrates an exemplary network architecture in which or with which proposed system of the present disclosure can be implemented, in accordance with an embodiment of the present disclosure.

Referring to FIG. 1 that illustrates an exemplary network architecture for (100) (also referred to as network architecture (100)) in which or with which a machine emergency detecting system (110) or simply referred to as the system (110) of the present disclosure can be implemented, in accordance with an embodiment of the present disclosure. As illustrated, the exemplary network architecture (100) may be equipped with (110) and may be communicatively coupled to a plurality of first computing devices (102-1, 102-2, 102-3 . . . 102-N) (interchangeably referred to as user equipment (102-1, 102-2, 102-3 . . . 102-N) and (individually referred to as the user equipment (UE) (102) and collectively referred to as the UE (102)) through a second computing devices (104-1, 104-2 . . . 104-N) (interchangeably referred to as the base station (104-1, 104-2 . . . 104-N) and individually referred to as the base station (104) and collectively as base stations (104)) be further operatively coupled to the base stations (104) via a third computing device (interchangeably referred to as Open radio access network Radio Unit (108)). The system (110) may be further communicatively coupled to the one or more fourth computing devices (114) (interchangeably referred to as nodes (114)).

In an embodiment, the system (110) may be equipped with a machine learning engine (ML) (214) that may cause the system to receive a set of messages pertaining to emergencies associated receive a first set of data packets, the first set of data packets pertaining to a plurality of messages from the one or more first computing devices (102) in the network (106), receive a second set of data packets pertaining to a plurality of messages from the one or more base stations (104) in the network (106), receive a third set of data packets pertaining to a plurality of messages from the O-RAN RU (108) in the network (106), receive a fourth set of data packets pertaining to a plurality of messages from a plurality of nodes (114) in the network (106). The system (110) may extract, by using the ML engine (214), a set of attributes from the first, second, third and fourth set of data packets received, the set of attributes pertaining to one or more emergencies associated with the one or more first computing devices (102), the one or more base stations (104), the O-RAN-RU (108) and the plurality of nodes (114) and, classify, by the ML engine (214), the one or more emergencies into a set of predefined classes based on a predefined set of instructions. For example, the one or more emergencies can be any machine emergencies associated with defects or other malfunctions occurring in the machines.

In an embodiment, the ML engine (214) configured to process and handle the one or more emergencies based on a set of instructions associated with each predefined class.

For example, machine emergencies may be defined to handle specific verticals such as Industry 4.0. Railways. Power Grids and the like. The new classification of emergency type is to cater for different real time machine type emergency that occurs in the IoT applications.

In an exemplary embodiment, the system (110) may be configured to define new emergency types and handling such emergencies in a cellular network. For example, new emergency attach type in networks may allow machines of particular types to attach with different clauses even when SIM cards might not be available.

In another exemplary embodiment, the new types of emergencies may be defined and categorised as new classes of machine emergencies. For example, emergency at one or more sensors and actuators may be categorised as Class A emergencies, emergencies in a machine may be categorised as Class B Emergencies, emergencies in a production line may be categorised as Class C Emergencies, emergencies in a plant may be categorised as Class D emergencies and the like. Handling for each of the above emergency type varies based on the emergency types. For Class A and B emergencies can be handled "automatically" via appropriate responses. For class C and D emergencies human interventions are visualized as such the procedures for handling Class C and D type machine emergencies are different.

In an embodiment, the Class A Machine emergency at the machine level may be where in the data from the sensors embedded in an individual machine indicating that something might be wrong in the said machine is claimed as a machine level emergency. As an embodiment the sensors in a lathe machine to detect wear and breakage and correcting thermal distortion as well as for precise blade positioning providing data which indicates that the machine needs to be attended to for the said issues. Similarly, as a second embodiment, the sensors to detect the efficiency of an individual robot for erosion in precision or the speed of activity indicating negative values as a problem with the machine that needs attention may be classified as a Class A machine emergency type. One or more of the sensors with a processor and the software to aggregate data from other sensors in a machine shall aggregate the data from multitude of sensors in a machine to formulate the emergency message.

In an embodiment, the Class B Machine emergency at the production line may be multiple machines typically defines a production line, the production line can be a car painting line as an example where multiple of individual machines are assigned jobs to complete a defined job. We define an emergency type to indicate problems with a production line where in the data from the sensors embedded in an the said production line constituting multiple of machines and sensors in the multiple of the machines and support functions are aggregated by one of the sensors acting as a master sensor and which helps in aggregating the data from the said sensors in a production line to detect if there is an emergency. The emergencies may be defined in the master sensor as a correlation table defining the thresholds of the sensor data from the individual sensors to define a production line emergency.

In an embodiment of the present invention the Class C Machine emergency at the factor shop floor may be multiple production lines typically defines a factory shop floor, the shop floor as an example being responsible for the complete production/assembly of a car engine. We define an emergency type to indicate problems with a factory shop floor where in the data from the sensors embedded in said multitude of production lines constituting multiple of machines and sensors in the multiple of the machines and support functions are aggregated by one of the sensors acting as a master sensor and which helps in aggregating the data from the said sensors in the multitude of production lines to detect if there is an emergency. The emergencies are defined in the master sensor as a correlation table defining the thresholds of the sensor data from the individual sensors to define a production line emergency.

In an embodiment of the present invention the Class D Machine emergency at the factor level may be multiple factory shop floors typically defines a factory where the factory would be as an example responsible for the complete production of a cay make. We define an emergency type to indicate problems with a factory itself where in the data from the sensors embedded in an the said multitude of production lines constituting multiple of machines and sensors in the multiple of the machines and support functions are aggregated by one of the sensors acting as a master sensor and which helps in aggregating the data from the said sensors in the multitude of production lines to detect if there is an emergency. The emergencies are defined in the master sensor as a correlation table defining the thresholds of the sensor data from the individual sensors to define a production line emergency. The sensors may include fire detection sensors, images from a camera indicating attempted theft or a theft in progress or other multitude of sensors such as motion detection sensors to detection movement where there should be none.

In an embodiment, emergency access may be requested by the first computing device (102) (also referred to as the User Equipment 102 or UE 102) via a set of instructions that may be a part of the Service Request IE sent part of the Attach/power distribution unit (PDU) establishment/modification procedure.

In an exemplary embodiment, a predefined structure may be sent during the PDU establishment procedure.

In yet another embodiment, the initial bits may be sent on establishment of cause to indicate the emergency type and rest of the data part of the packet transfer post the establishment of the PDU.

In an exemplary embodiment, the system (110) may configure a mechanism for handling emergency via newly defined quality of service (QOS) profiles. This will be applied by the network basis the emergency type that is shared in the service request cause. In one another embodiment the application may use a modem interface (AT commands) to make aware the modem and the network of the emergency type to configure and map the new identified QoS profile and/or handle the emergency appropriately. The AT command may interface and identify the emergency type and the necessary signalling identifiers to let the network know of the right type of QoS profile to identify and apply.

In an embodiment, the system (110) may be a System on Chip (SoC) system but not limited to the like. In another embodiment, an onsite data capture, storage, matching, processing, decision-making and actuation logic may be coded using Micro-Services Architecture (MSA) but not limited to it. A plurality of microservices may be containerized and may be event based in order to support portability.

In an embodiment, the network architecture (100) may be modular and flexible to accommodate any kind of changes in the system (110).

In an embodiment, the system (110) may be remotely monitored and the data, application and physical security of the system (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, a communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, the centralized server (112) may be included in architecture (100). The centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more first computing devices (102), the one or more mobile devices (not shown in FIG. 1) may communicate with the system (110) via set of executable instructions residing on any operating system, including but not limited to. Android™, iOS™. Kai OS™ and the like. In an embodiment, one or more first computing devices (102) and the one or more mobile devices may include, but not limited to, any electrical, electronic, electro-mechanical or an equipment or a combination of one or more of the above devices such as mobile phone, smartphone. Virtual Reality (VR) devices. Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (102), and the one or more mobile devices may not be restricted to the mentioned devices and various other devices may be used. A smart computing device may be one of the appropriate systems for storing data and other private/sensitive information.

Figure 2A:
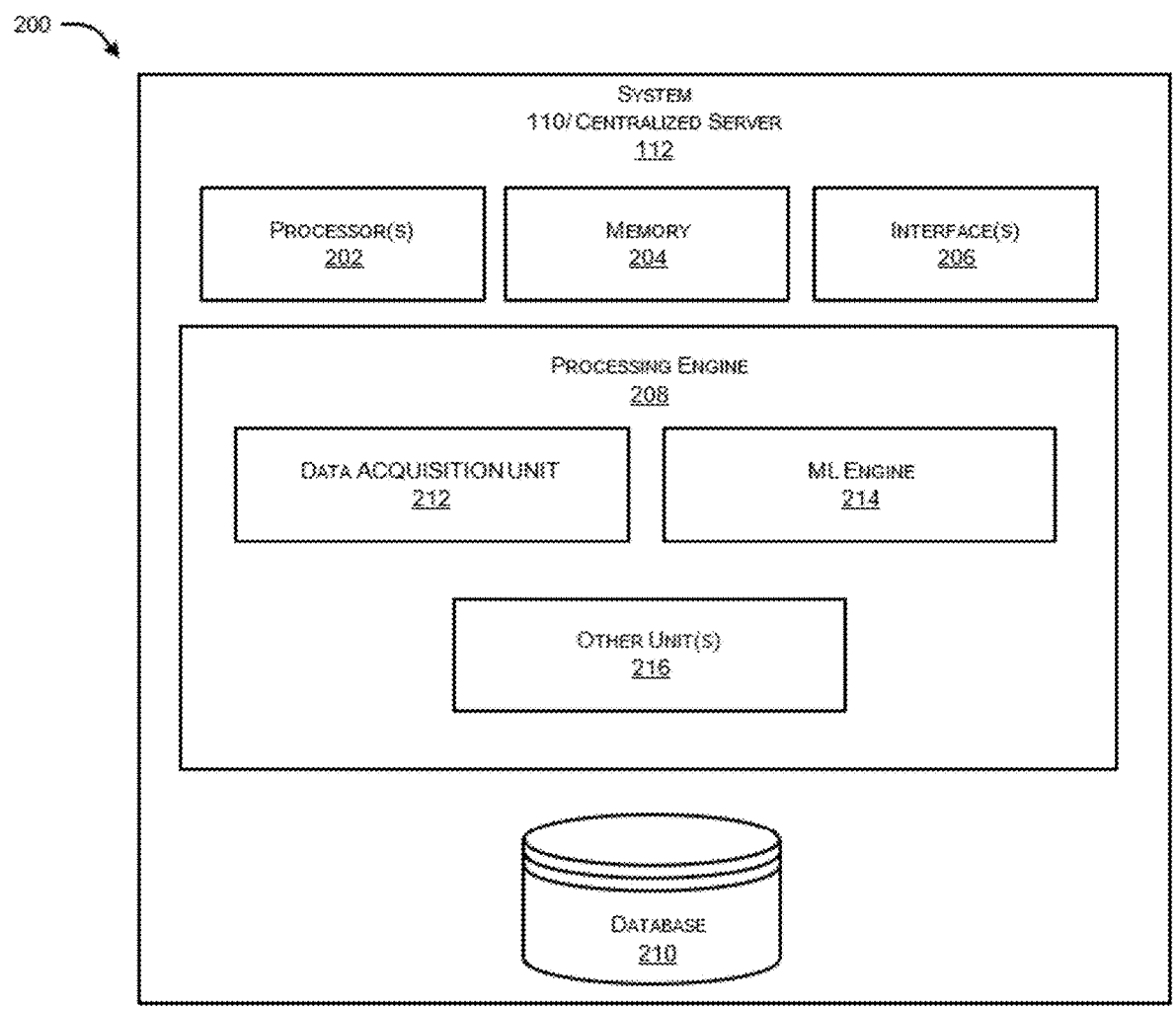
FIG. 2A illustrates an exemplary representation of proposed system detecting and handling machine emergencies in a network, in accordance with an embodiment of the present disclosure.

FIG. 2A with reference to FIG. 1, illustrates an exemplary representation of data receiver module (110) for facilitating real time event data feeds, in accordance with an embodiment of the present disclosure. In an aspect, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (206) of the data receiver module (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) 206. The interface(s) 206 may comprise a variety of interfaces, for example, interfaces for data input and output devices, referred to as I/O devices, storage devices, and the like. The interface(s) 206 may facilitate communication of the system (110). The interface(s) 204 may also provide a communication pathway for one or more components of the data receiver module (110). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more engines selected from any of a data acquisition engine (212), a machine learning (ML) engine (214), and other engines (216).

Figure 2B:
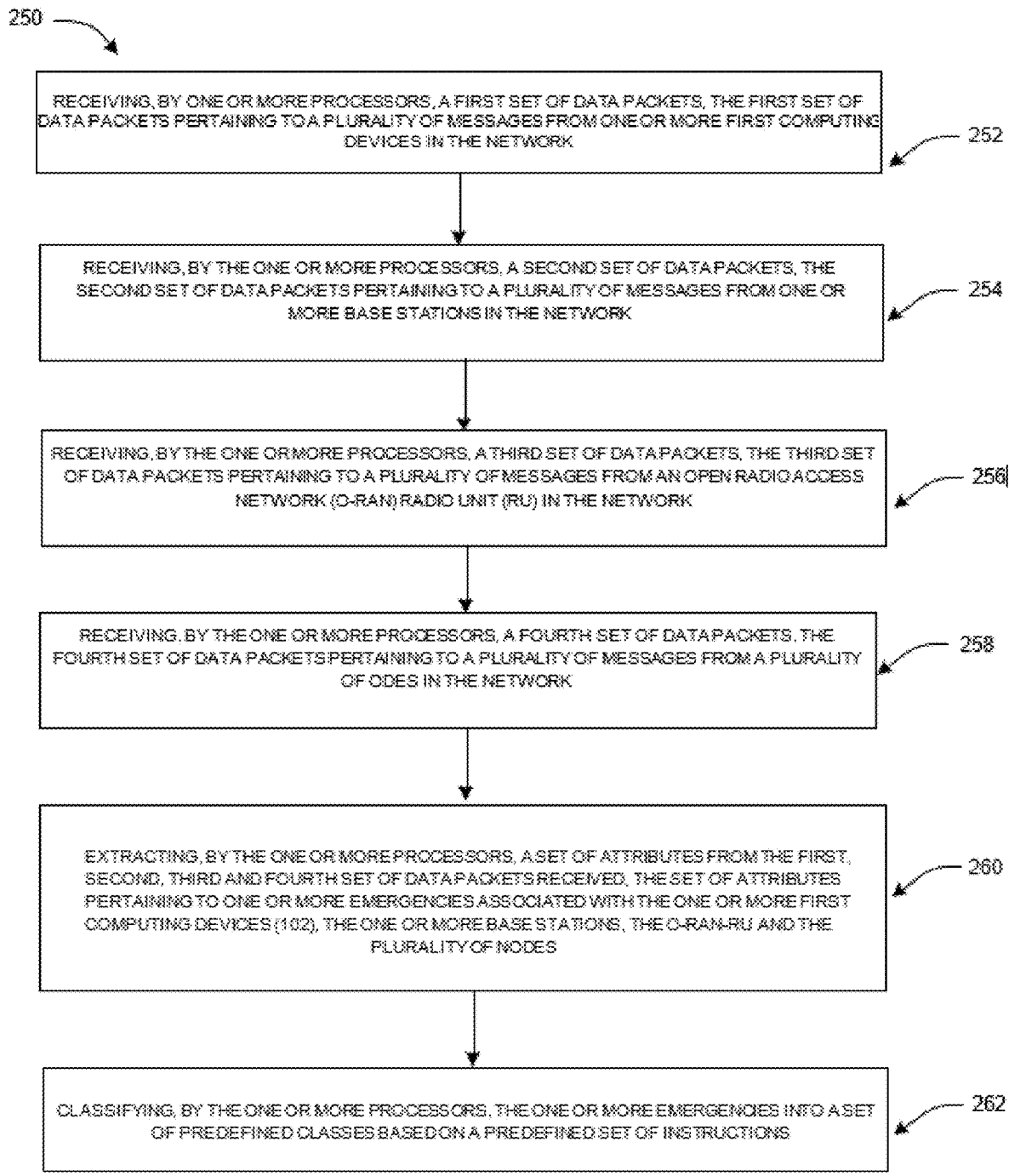
FIG. 2B illustrates an exemplary representation of proposed method for detecting and handling machine emergencies in a network, in accordance with an embodiment of the present disclosure.

FIG. 2B illustrates an exemplary representation of proposed method (250) for detecting and handling machine emergencies in a network (106), in accordance with an embodiment of the present disclosure. As illustrated, the method (250) may include at 252, the step of receiving, by one or more processors (202), a first set of data packets, the first set of data packets pertaining to a plurality of messages from one or more first computing devices (102) in the network (106). For example, the plurality of messages may include information about the one or more first computing devices such as user equipment (UE) that includes any handheld devices, phones, laptops, pagers, mobile radios, smart phones, laptops, tablets and the like.

The method may also include at 254, the step of receiving, by the one or more processors (202), a second set of data packets pertaining to a plurality of messages from one or more base stations (104) in the network. For example, the plurality of messages may include information about the one or more base stations such macro cells, micro cells, pico cells and the like.

Further at 256, the method may include the step of receiving, by the one or more processors (202), a third set of data packets, the third set of data packets pertaining to a plurality of messages from the Open radio access network (O-RAN) Radio Unit (RU) (108) in the network. For example, the plurality of messages may include information about the open network.

The method may include at 258, the step of receiving, by the one or more processors (202), a fourth set of data packets pertaining to the plurality of messages from a plurality of nodes (114) in the network. For example, the plurality of messages may include information about the plurality of nodes such as gNB nodes. Data communications nodes, physical network nodes include data communications equipment or devices that sit between data terminal equipment (DTE) and data transmission circuits. Internet network. LANs and wide area networks. Telecommunications network. Cable system and the like.

The method may further include at 260, the step of extracting, by a machine learning (ML) engine (214) associated with the one or more processors (202), a set of attributes from the first, second, third and fourth set of data packets received, the set of attributes pertaining to one or more emergencies associated with the one or more first computing devices (102), the one or more base stations (104), the O-RAN-RU (108) and the plurality of nodes (114). For example, the system (110) may be configured to sense any kind of anomalies or emergencies in the one or more first computing devices (102), the one or more base stations (104), the O-RAN-RU (108) and the plurality of nodes (114)

Furthermore, the method may include the step of classifying, by the ML engine (214), the one or more emergencies into a set of predefined classes based on a predefined set of instructions. For example, the system (110) may identify machine emergency types within a 3GPP network/device (covering LTE, 5G, 6G), enrich the emergency messages with appropriate data such as location, machine ID. Plant ID and the like and identify the appropriate emergency servers that can handle the type of emergency, redirecting the emergency messages to the appropriate servers along with enriched data.

Figure 3A:
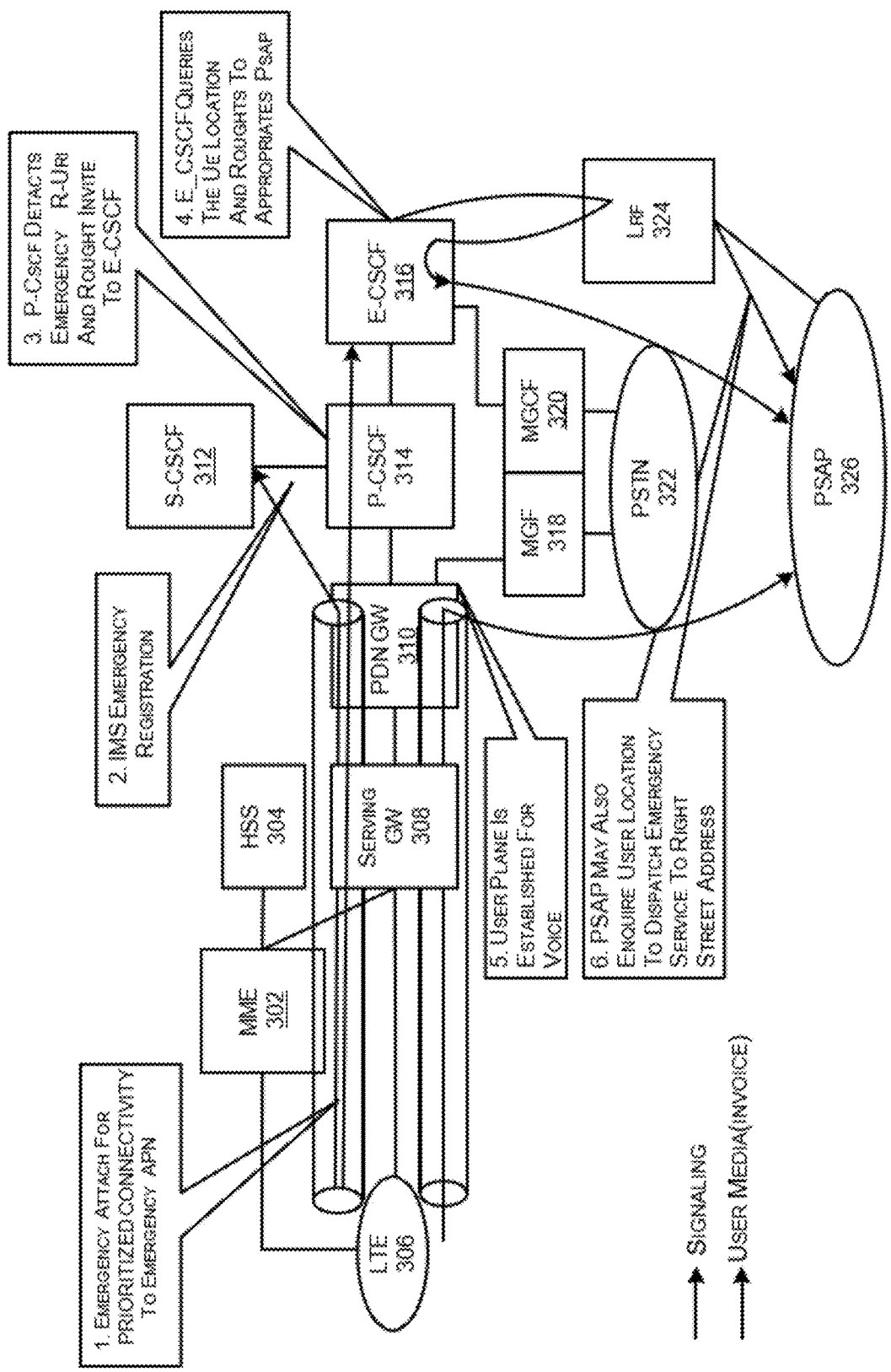
FIGS. 3A and 3B illustrate exemplary representations of existing system network architecture and message flow, in accordance with an embodiment of the present disclosure.
Figure 3B:
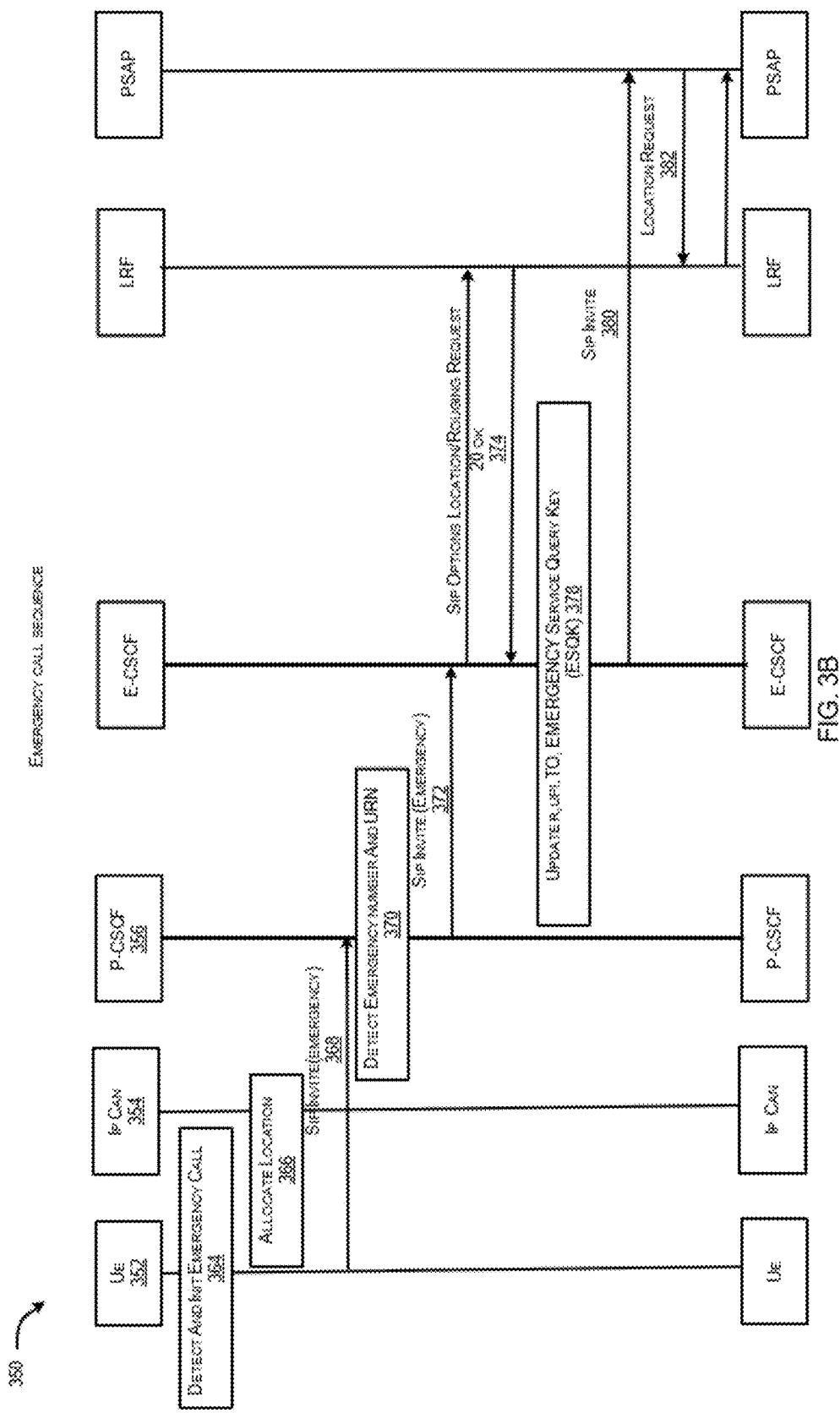

FIGS. 3A-3B illustrate exemplary representations of an existing network system architecture and message flow, in accordance with an embodiment of the present disclosure. As illustrated, in an aspect. FIG. 3A illustrates an existing emergency definition and handling mechanism in 3GPP caters to human emergencies that does not address machine emergencies. The introduction of IoT and especially IIoT (Industrial IoT) opens numerous types of emergencies that will have to be handled differently from human emergencies. The existing network may include Long term evolution 306 (LTE 306), mobility management entity (302) or MME (302), Home subscriber server (304) or HSS (304), a serving gateway (GW) (308), a PDN gateway (310), a serving Call Session Control Function 312 (S-CSCF 312), a proxy CSCF 314 (P-CSCF 314), a media gateway (MGW) (318), a media gateway control function (MGCF) (320), Public Switched Telephone Network (PSTN) (322), location retrieval function (LRF) (324), Emergency (E)-CSCF (316), public-safety answering point (PSAP) (326). For example, a UE using the LTE (306) might require emergency attach for prioritised connectivity to emergency access point name (APN). A signal is sent for IP multimedia system (IMS) emergency registration by the S-CSCF (312). The P-CSCF (314) detects emergency Request-Uniform Resource identifier (R-URI) and routes invite to the E-CSCF (316). The E-CSCF (316) queries the UE location and routes to the appropriate PSAP (326). A user plane may be established for voice through the MGW (318) and the MGCF (320). The PSAP (326) may also enquire UE location through the LRF (324) to dispatch emergency services to right street address.

FIG. 3B illustrates an exemplary representation of an existing emergency call sequence between a UE (352) and a PSAP (326). For example, the UE (352) detects and initiates an emergency call, allocate location, SIP INVITE (emergency) to the P-CSCF (314). The P-CSCF (314) detects emergency number or URN. The P-CSCF (314) again sends SIP INVITE (Emergency) to the E-CSCF (316) and SIP Options location/Routing request which the LRF (324) okays. THE E-CSCF (316) updates R-URI, to emergency service query key (ESQK), then sends SIP INVITE to the PSAP (326). THE PSAP (326) requests for location from the LRF (324) and the LRF (324) responds with the location details.

In an example, the notification about the emergency services to the network is done via passing a normal emergency type information as a part of service request-Establishment cause. Emergency access may be requested by the UE (User Equipment) or mobile device via Establishment_Cause IE part of the Service Request IE sent part of the Attach/PDU establishment/modification procedure. For example, the emergency access may be given by a 5G NR:

```
Establishment_Cause ::= ENUMERATED {
    emergency, highPriorityAccess, mt-Access, mo-
    Signalling, Data, mo-VoiceCall, mo-VideoCall, mo-
    SMS, mps-priorityAccess,mcsPriorityAccess, spare6,
    spare5, spare4, spare3, spare2, spare1}
```

As can be seen there are no way to communication to the network any other emergency types that may arise from the industrial IoT or Machine types in the current cellular systems. Thus, in the current system, network always assigns default QoS profile to the machine emergency data treating them as a regular internet data which will always be on best-effort basis.

Figure 4:
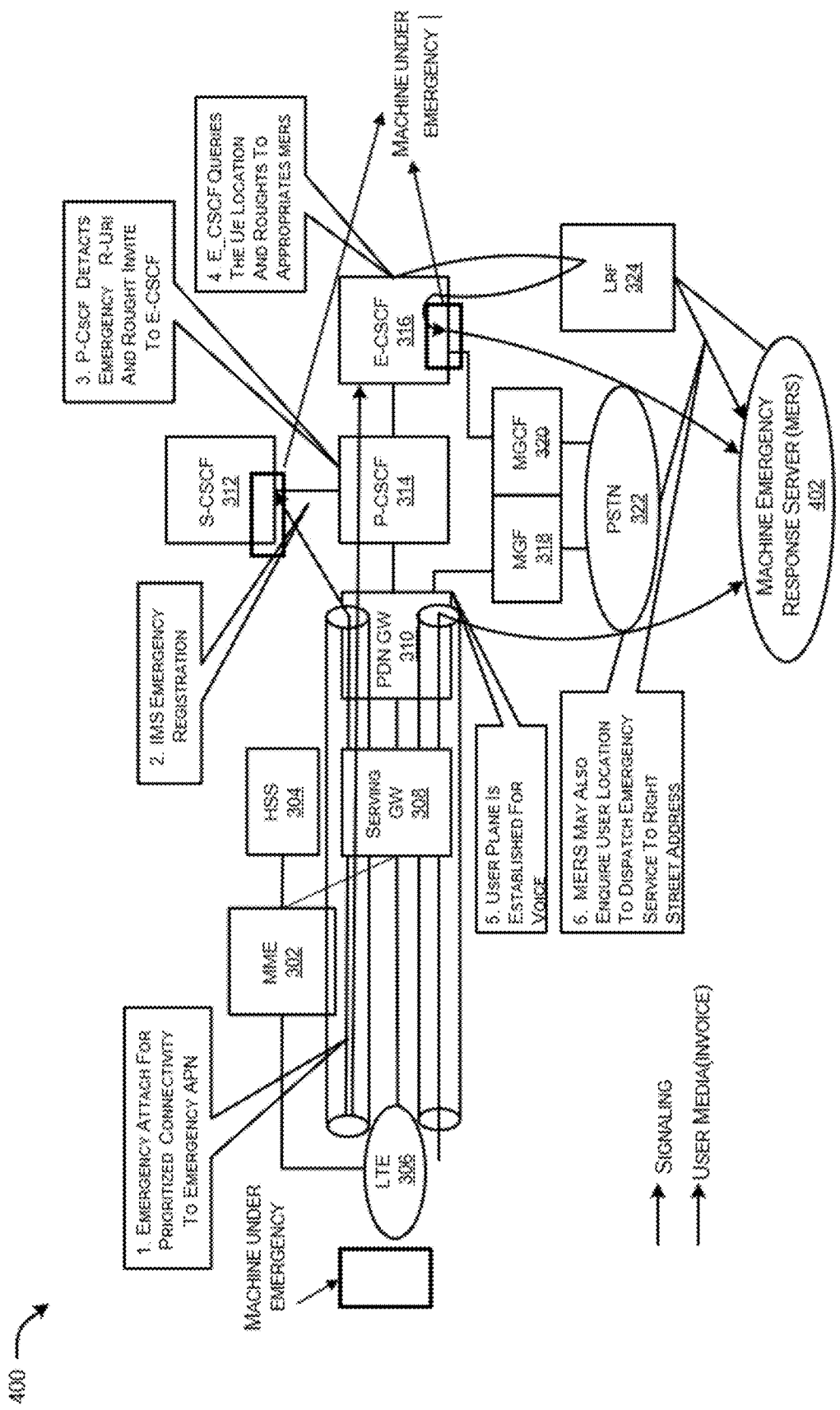
FIG. 4 illustrates an exemplary representation of the proposed network system architecture, in accordance with an embodiment of the present disclosure.

To cater for such Machine emergency requirement, we propose a new establishment cause IE for handling such machine emergency scenarios FIG. 4 illustrates an exemplary representation of the proposed network system architecture, in accordance with an embodiment of the present disclosure. As illustrated, the proposed network may include Long term evolution 306 (LTE 306), mobility management entity (302) or MME (302), Home subscriber server (304) or HSS (304), a serving gateway (GW) (308), a PDN gateway (310), a serving Call Session Control Function 312 (S-CSCF 312), a proxy CSCF 314 (P-CSCF 314), a media gateway (MGW) (318), a media gateway control function (MGCF) (320), Public Switched Telephone Network (PSTN) (322), location retrieval function (LRF) (324), Emergency (E)-CSCF (316), machine emergency response server (MERS) (402) communicatively coupled to a machine emergency response (MERS) handler (402) that may reside in the IMS entity.

In an embodiment, part of the communicating the machine emergency one possible ways will be to use the IMS to share a pre-recorded over voice message/SMS to the preconfigured numbers that might belong to the primary/secondary responders. To communicate the same Application, the MERS (402) may use an AT interface and send AT commands to a modem to share a preconfigured voice message to a preconfigured number. This preconfigured message or the preconfigured number can be part of the image in the device in a memory storage (ROM) or can be configured by an application/emergency server via http/TCP/MQTT messages.

In an exemplary embodiment, at least three mechanisms to convey the machine emergency type may be provided by the MERS (402). In one exemplary embodiment, spare values in the existing EstablishmentCause IE may be used as given by:

```
EstablishmentCause ::= ENUMERATED {
    emergency, highPriorityAccess, mt-Access, mo-
    Signalling, Data, mo-VoiceCall, mo-VideoCall, mo-
    SMS, mps-priorityAccess,mcsPriorityAccess, ClassA,
    ClassB, ClassC, ClassD, spare2, spare1}
```

In another exemplary embodiment, a new Information Element Identifier (IEI) may be defined. For example

```
EstablishmentCause-ME ::= ENUMERATED {
    ClassA, ClassB, ClassC, ClassD, spare3, spare2,
    spare1}
```

In another exemplary embodiment, a fixed bit stream to identity the type of machine emergency may be used. For example,

```
EstablishmentCause-ME ::={11100000}
Where,
-8 bit representation ::
-8th bit - ClassA
-7th bit - ClassB
```

-continued

```
-6th bit - ClassC
-5th bit - ClassD
-4th - 1st bit - Spare
```

In an exemplary embodiment, a schema for the plurality of emergencies may be used. Apart from the above IEI defined to convey the machine emergency type, a following structure may be given by

```
EmergencyType::={
    EmergencyClass::={Class A, Class B, Class C, Class D,.. },
    LocationInfo:={Lat, Long},
    <Cell ID>,
    <Type::={Alert-0, Warning-1, Message-2},
    <Identifier>::={IMSI/TMSI/P-TMSI>},
    <Data::={.....}}
```

The structure defined may be shared across to the network in at least two possible ways such as sending the entire structure defined above initially during the PDU establishment procedure and sending the initial bits on establishment cause to indicate the emergency type and rest of the data part of the packet transfer post the establishment of the PDU.

In an exemplary embodiment, if the computing devices do not support the GPS/GNSS capability, then as per the above structure device will share the GNSS information in terms of latitude/longitude. In the absence of the GSP/GNSS capability in the computing device, the network may trigger a measurement report to fetch the location information of the device and report to LRF/SMLC via which emergency servers can request for LoC info via predefined APIs in 3GPP/ETSI TS but not limited to the like.

Figure 5A:
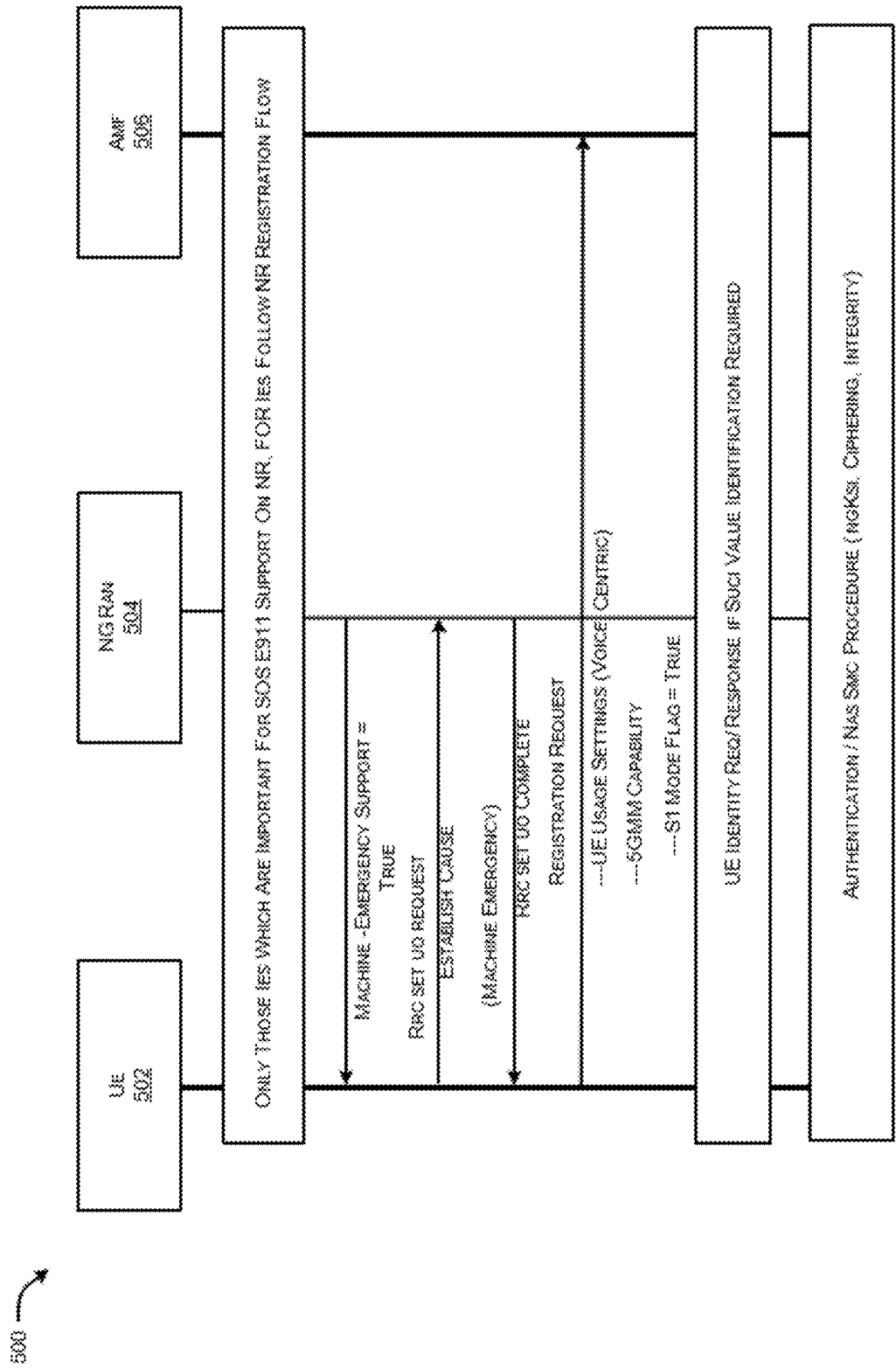
FIGS. 5A-5C illustrate exemplary example call flows for sharing the emergency type across the system, in accordance with an embodiment of the present disclosure.

FIG. 5A illustrates an exemplary example call flow for sharing the emergency type across the system and thereby network assigns the right QoS profile and thus the resource management. As illustrated, SIB 1 broadcasts the capability to support machine type emergencies and for certain class of machine types. A UE 502 (MTC device) reads the emergency support and the class of UEs 502 (Machine Types) that can attach to the IoT network. The Machine type UE sends the RRCSetupRequest with the establishment cause as Machine Type emergency and with the other attributes as indicated before (Class of emergency type i.e. Class A or Class B or Class C or Class D).

In an exemplary embodiment, for indicating machine type emergency in the UE/Modem the system may use an application layer in the modem interface i.e. the AT command interface to convey the emergency types so that same can be used by the modem to convey to the network based on the messages/IE's. The new AT commands used by the Application residing in the end device to convey to the modem and to the network on the emergency Type are highlighted in TABLE 1 below

| AT%MEMERGENCYTYPE | |
| --- | --- |
| Command | Possible responses |
| % MEMERGENCYTYPE =<cmd>[,<param1>[,<param2>]] | OK/ERROR |
| % MEMERGENCYTYPE? | OK/ERROR |
| % MEMERGENCYTYPE =? | % MEMERGENCYTYPE: List of supported <cmd> |

For example, AT command to share the Machine emergency type along with its attributes to the modem as sent by the Application may use defined values such as Modem Obtaining application type information by the Application but not limited to the like.

Figure 5B:
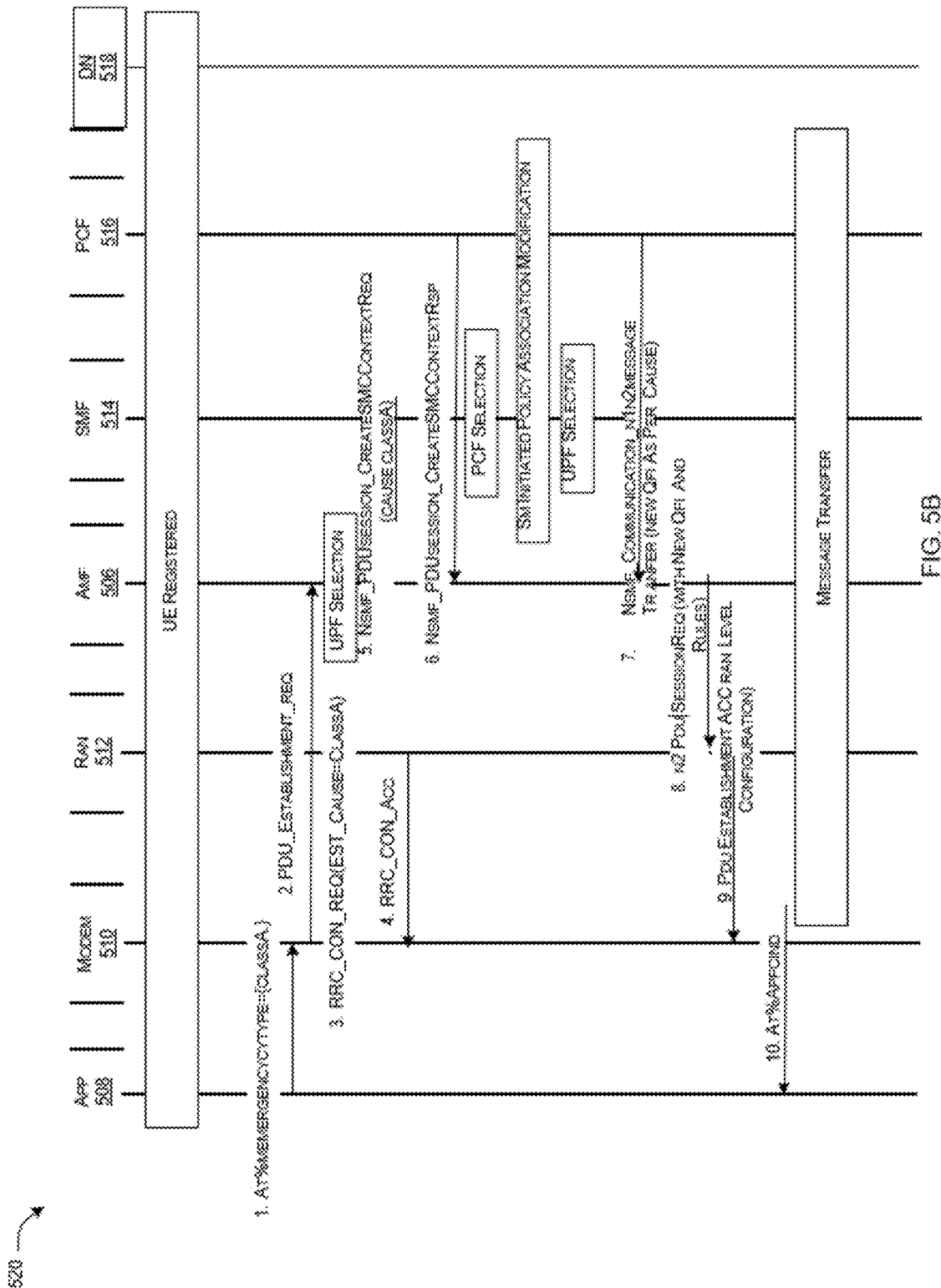

Another example is that the AT command may be used by the application to let modem know the Machine emergency type and the defined values may be given by <cmd>:

"MEMERGENCYTYPE" - Indicating the emergency type
configuration of the IoT / IIoT
device with param1.. N be the configuration parameters
as defined by the network or the
application server
Param 1...N indicate the type or attributes like -
   a. ClassA
   b. ClassB
   c. ClassC
   d. ClassD
   e. Etc
LocInfo
CellID
Type
Identifier = {IMSI, ...}
<Data>
Etc
<ResponseType>:
OK / ERROR FIG. 5B illustrates another example call flow for sharing the emergency type across the system and thereby network assignment of the right QoS profile and resource management.

Once the modem (510) receives the emergency types from the application (508) via the above AT command over the AT interface, modem then passes the same over the IE's defined earlier and use the same part of service request IE which in turn is sent part of Attach (including emergency Attach), PDU establishment/modification procedure. Once the network is aware of the emergency cause, PCF/PCRF assigns the right QCI/5QI values as per TABLE 2 defined below or as defined in the 3GPP TS 23.501—

| 5QI Value | Resource Type | Default Priority Level | Packet Delay Budget | Packet Error Rate | Default Maximum Data Burst Volume | Default Averaging Window | Default Averaging Window |
|---|---|---|---|---|---|---|---|
| A | GBR | 0-N | XX ms | $10^{-n}$ | — | XX ms | Machine emergency Type - Class A - Emergencies at Sensors and actuators |
| B | | 0-N | XX ms | $10^{-n}$ | — | XX ms | Machine emergency Type - Class B - Emergencies at a Machine |
| C | | 0-N | XX ms | $10^{-n}$ | — | XX ms | Machine emergency Type - Class C - Emergencies at a production line |
| D | | 0-N | XX ms | $10^{-n}$ | — | XX ms | Machine emergency Type - Class D - Emergencies at a plant |

In another embodiment, the system may allow SIM less operation by:
   sending the IMSI/TMSI/P-TMSI as a part of the data sent by the device using the newly defined Emergency Type Schema/Structure (as shown above);

network triggering to IDENTITY REQ procedure (IMSI as identifier) as a mandatory procedure during the Registration/Emergency Registration.

Figure 5C:
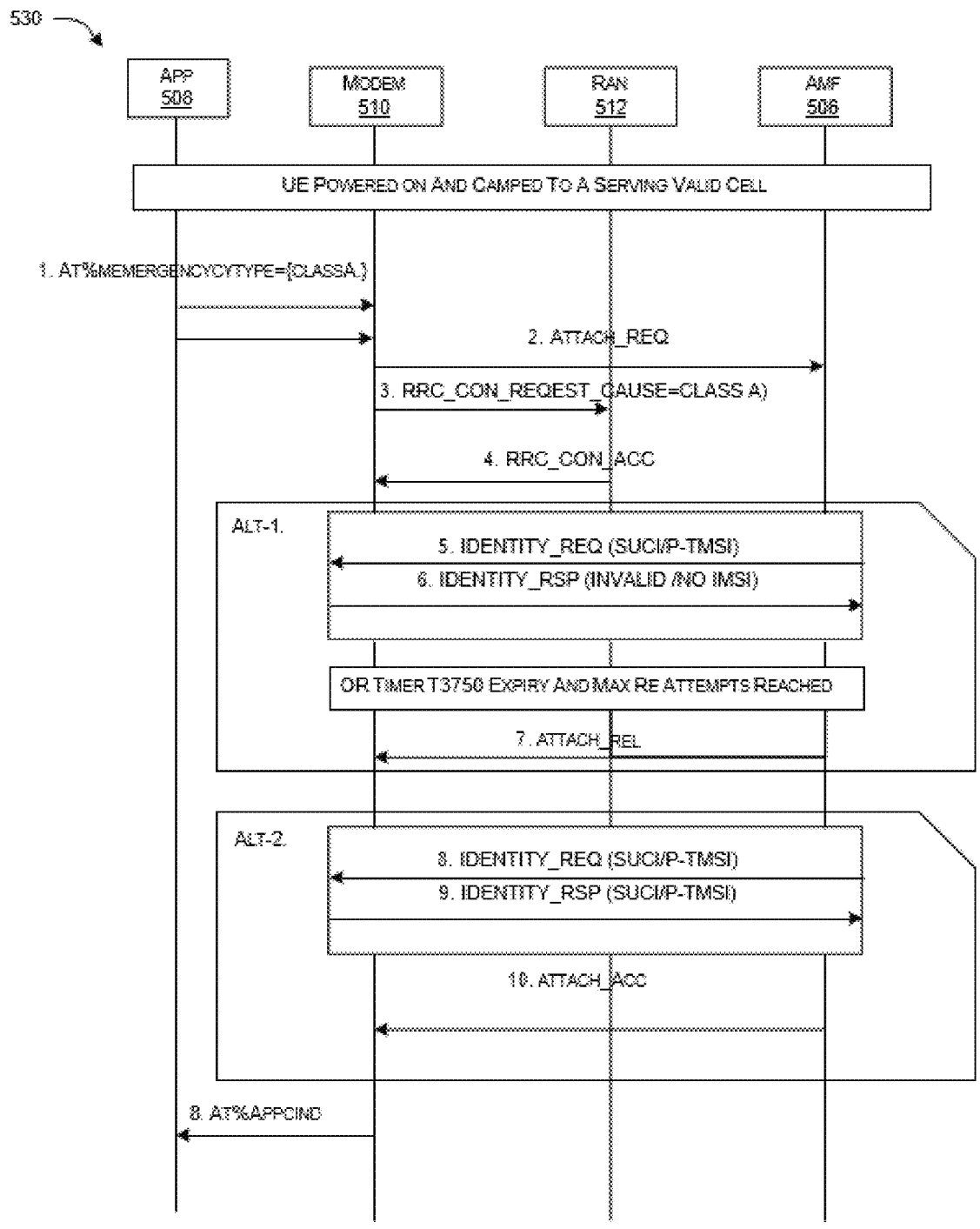

FIG. 5C illustrates another example call flow to indicate the attach procedure to include IDENTITY procedure part of machine emergency scenario.

Once the modem (510) receives the emergency types from the application (508) via the above AT command over the AT interface, modem then passes the Attach (including emergency Attach procedure. Once the network (512) is aware of the attach procedure, in one embodiment, the AMF (506) sends an IDENTITY request to the modem and gets a response from the modem (510). If the timer expires, or a maximum number of re-attempts have been reached, the AMF (506) sends an attach failed message. In an alternate embodiment, the AMF sends an IDENTITY request to the modem (510) and gets a response from the modem (510). In an embodiment, the AMF sends an IDENTITY request to the modem and gets a response from the modem. Within the predefined time, the modem (510) then provides an attach acknowledgement and the attach procedure is implemented on the application (508).

Figure 6:
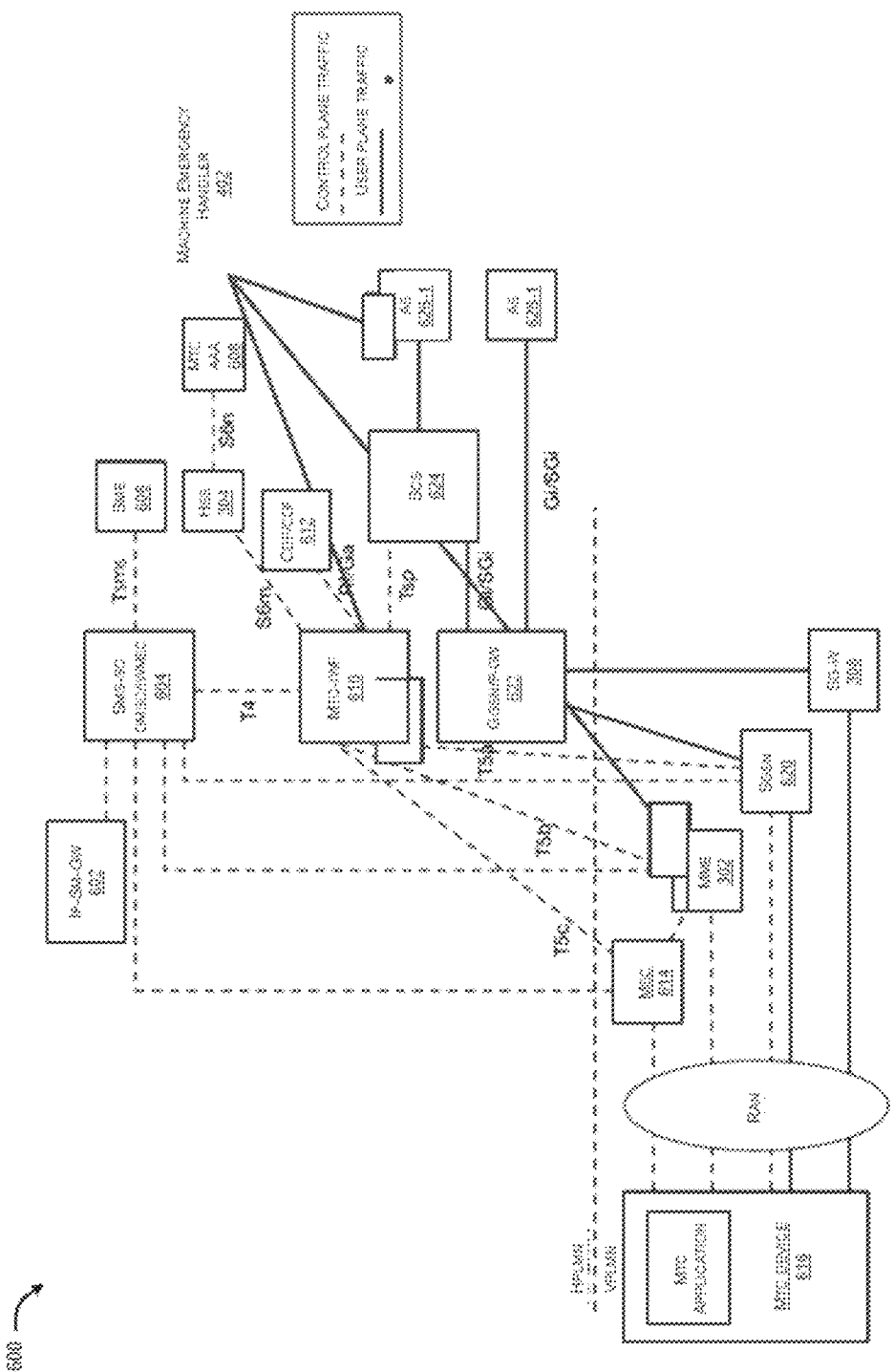
FIG. 6 illustrates an exemplary NB-IoT system, in accordance with an embodiment of the present disclosure.

FIG. 6 illustrates an exemplary NB-IoT system, in accordance with an embodiment of the present disclosure. As illustrated, in the case of a NB-IoT system, the emergency handler can be in the MME as an emergency handler proxy, in the MTC-IWF (Interworking function) (610) or at the application server (AS) (626) as shown in the FIG. 6. If the machine emergency handler (402) entity resides in the MME itself, it can handle Class A and Class B type emergencies by fixed response of shutting the device such as Sensor type or a Machine but not limited to the like associated with the MTC UE/SIM (616).

If the machine emergency handler (402) entity resides in the IMS-IWF (602), it can handle Class A BC and D types of machine emergencies. The MME to IMS-IWF i.e the T5b interface is enhanced in this case to support machine emergency types.

In an embodiment, the Class C and the Class D type emergencies may be handled at the Application Server (AS) (626) and the IMS-IWF needs to be aware that the call type is of Machine emergency call type. In this case the T5b interface between the MME and the IMS-IWF is enhanced with the emergency type indicator as indicated in the "emergency Schema". It must be understood that the above example covering an IoT system is but just an example and the proposed invention can be extended to other cellular architectures such as 5G, 6G or any private network variants of the above-mentioned cellular technologies.

In another embodiment the emergency handler (402) entity can reside outside the 5G network in an Application server, new emergency interfaces in such a case can be defined via the Network Exposure Function (NEF) to reach to the emergency handler and set appropriate data paths between the Machine and the server.

Figure 7A:
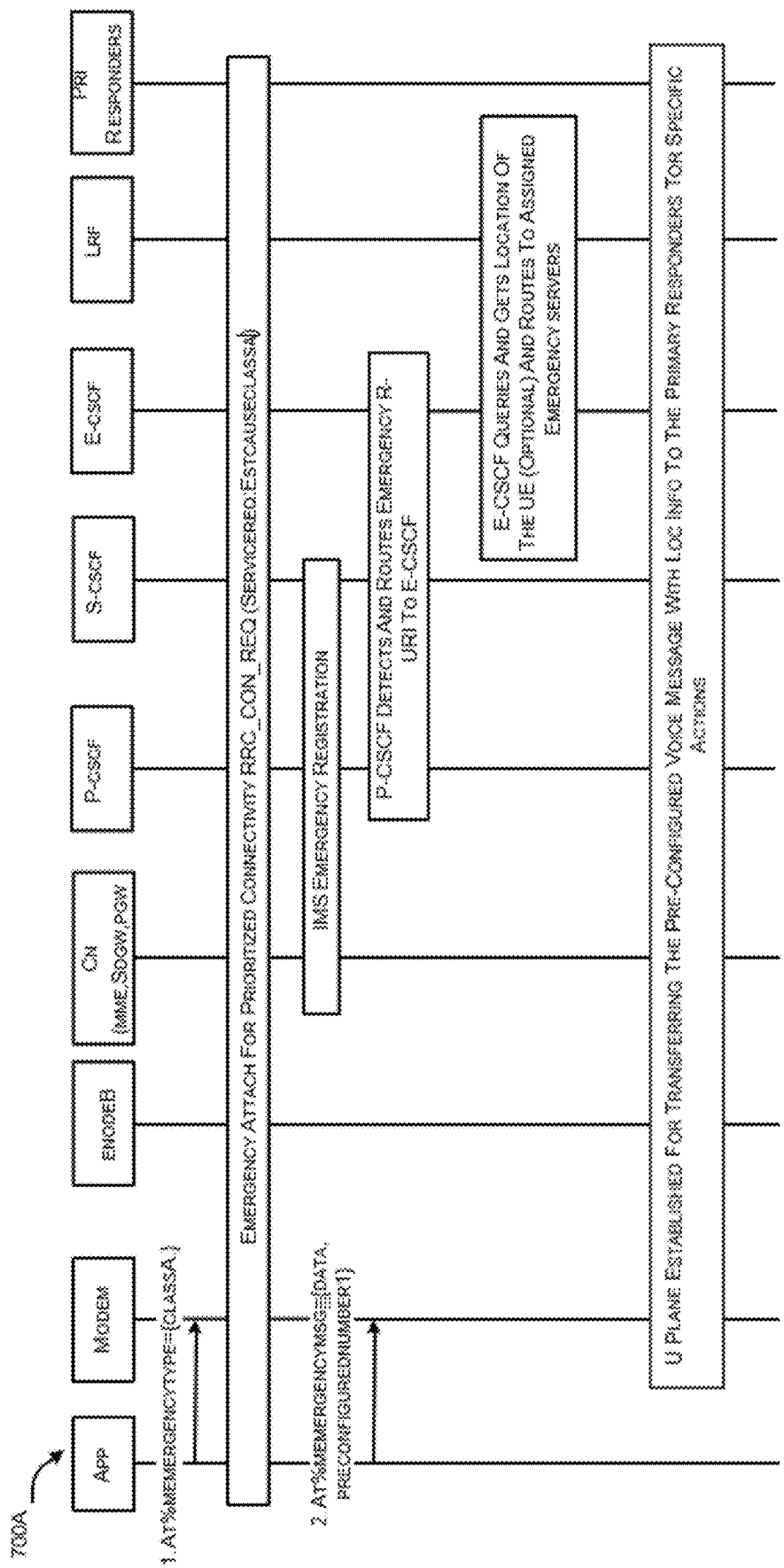
FIGS. 7A and 7B illustrate embodiment of an alternative example call flow on how the machine emergency is transferred across cellular network over IMS in accordance with an embodiment of the present disclosure.
Figure 7B:
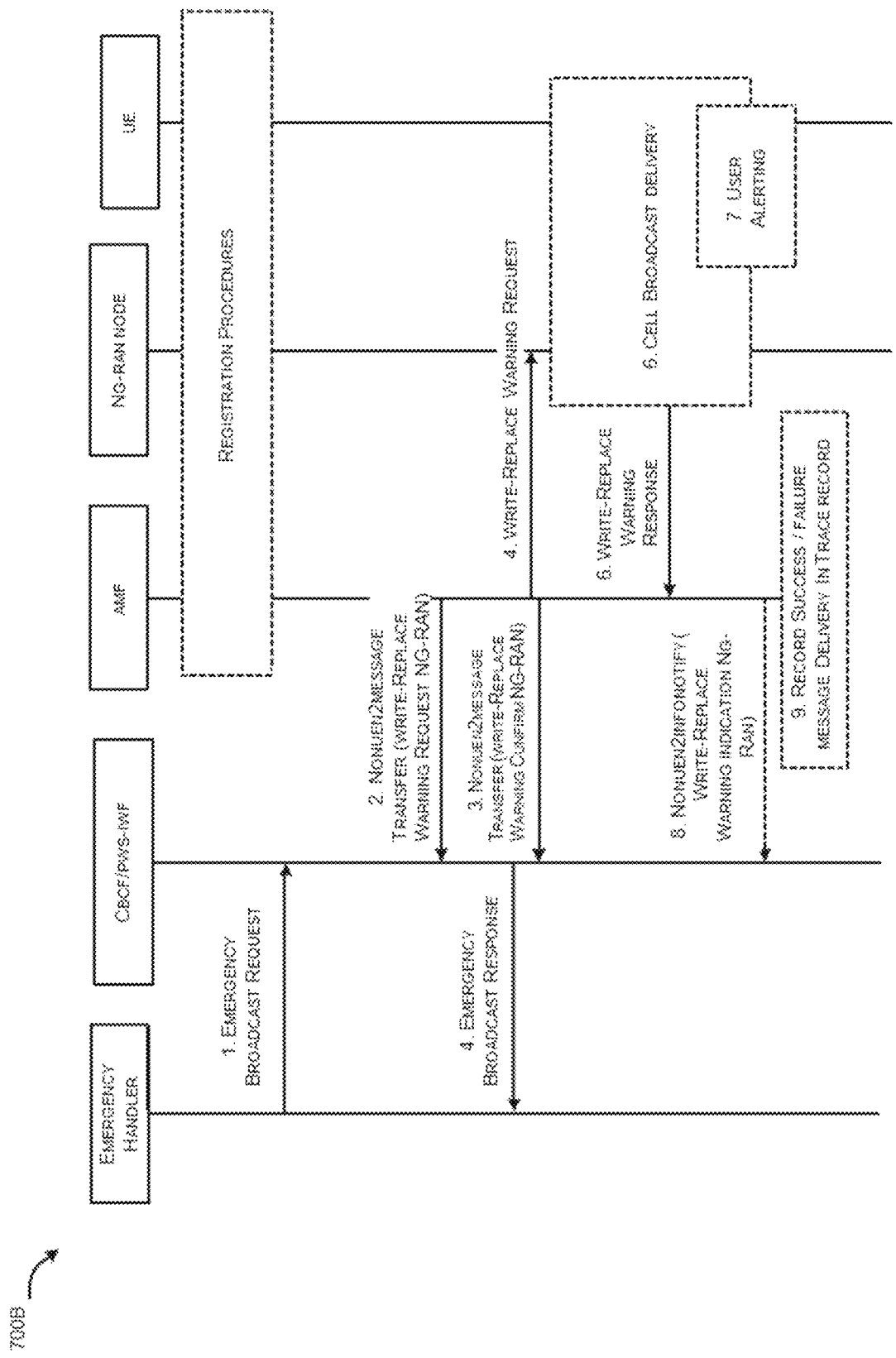

FIGS. 7A and 7B illustrate embodiment of an alternative example call flow on how the machine emergency is transferred across cellular network over IMS in accordance with an embodiment of the present disclosure. As illustrated, in an embodiment, when the Machine type emergency is a Class C or a Class D type, the granularity of emergency is much larger than just a machine, in such cases the emergency server will initiate a data channel with the emergency device and simultaneously initiate a broadcast type with multiple other registered numbers referred to as emergency responders.

In yet another exemplary embodiment, as illustrated in FIG. 7B, when the type of machine type emergency is a Class C or a Class D type, the emergency handler can use the Cell Broadcast Centre Function (CBCF)/Public Warning System (PWS) to initiate a broadcast of emergency data type. The emergency handler can also use any other broadcast/multicast mechanism to initiate a broadcast of relevant data. When a Class C or a Class D type emergency is indicated, data from not just that device BUT a host of devices across a plant/factory is sought by the emergency server to find out the nature of emergency. This is also assisted by the human responders who are part of the broadcast group.

TABLE 1 highlights the different types of machine emergencies

| Class | Type | Definition | Use cases | Examples |
|---|---|---|---|---|
| A | Emergencies at Sensors and actuators | If any defect is identified in the sensors and actuators used in various use cases/ categories | Mass production | Sensors to detect the next inline sequence of actions during production, Sensors to detect the defects etc |
|  |  |  | Healthcare | Sensors to detect the pressure, temperature etc |
|  |  |  | Machines used in plants/factories | Sensors used to detect the functionalities of the machines Sensors used to detect the overall conditions in the plant for normal functioning of the machines |
|  |  |  | Vehicle |  |
| B | Emergencies at a Machine | If any defect is identified in the functionality of the machines | Mass production | If a PCBA machine fails, then PCB assembly will completely go wrong |
|  |  |  | Healthcare | Machine failure at hospitals for monitoring of health care of the patients |
|  |  |  | Factories | Machine failure at plants leading the lower yields |
| C | Emergencies at a Prodution line | IF any defect is identified at the production line | Mass production/ factory line | Assembly line failure leading to losses. This can occur when one ore more stations leading to an overall production is at fault. A early detection of such events helps in immediate |

TABLE 1-continued highlights the different types of machine emergencies

| Class | Type | Definition | Use cases | Examples |
|---|---|---|---|---|
| D | Emergencies at factory floor | If any defect is identified at the factory floor, which is beyond the yield of assembly line issues leading to closure of entire factory | Mass production/ factory site | necessary human intervention to correct the lines. In case of failures identified in mutliple lines. Power failures, An unattended Class A/B/C emergencies leading to class D etc |

Figure 8:
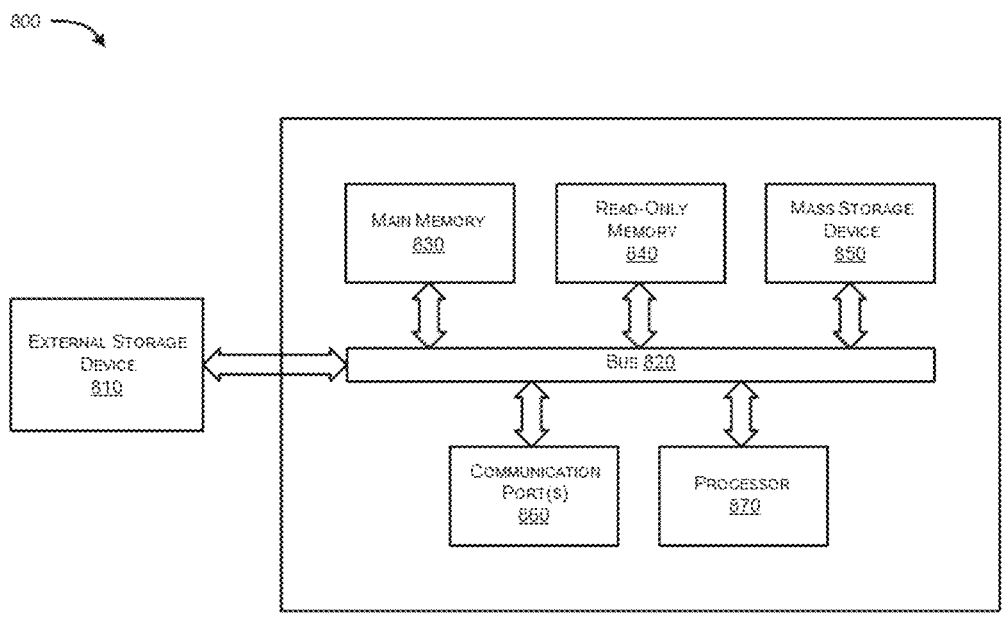
FIG. 8 illustrates an exemplary computer system in which or with which embodiments of the present invention can be utilized in accordance with embodiments of the present disclosure.

FIG. 8 illustrates an exemplary computer system in which or with which embodiments of the present invention can be utilized in accordance with embodiments of the present disclosure. As shown in FIG. 8, computer system 800 can include an external storage device 810, a bus 820, a main memory 830, a read only memory 840, a mass storage device 850, communication port 860, and a processor 870. A person skilled in the art will appreciate that the computer system may include more than one processor and communication ports. Examples of processor 870 include, but are not limited to, an Intel® Itanium® or Itanium 2 processor(s), or AMD® Opteron R or Athlon MP® processor(s), Motorola® lines of processors, FortiSOC™ system on chip processors or other future processors. Processor 880) may include various modules associated with embodiments of the present invention. Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects. Memory 830) can be Random Access Memory (RAM), or any other dynamic storage device commonly known in the art. Read-only memory 840 can be any static storage device(s) e.g., but not limited to, a Programmable Read Only Memory (PROM) chips for storing static information e.g., start-up or BIOS instructions for processor 870. Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 8K800), one or more optical discs, Redundant Array of Independent Disks (RAID) storage, e.g, an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g, a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 880 to software system.

Optionally, operator and administrative interfaces, e.g. a display, keyboard, and a cursor control device, may also be coupled to bus 820 to support direct operator interaction with a computer system. Other operator and administrative interfaces can be provided through network connections connected through communication port 860. The external storage device 810 can be any kind of external hard-drives, floppy drives, IOMEGA R: Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, the present disclosure provides for a unique and efficient solution to identify different types of machine emergencies and propose mechanisms to handle such emergencies including architectural systems that may be needed to handle such emergencies in a time effective manner.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

Some of the objects of the present disclosure, which at least one embodiment herein satisfies are as listed herein below.

The present disclosure provides for a system and method that facilitates SIM less emergency attach for machine type devices.

The present disclosure provides for a system and method that covers aspects of emergency attach for machine type devices.

The present disclosure provides for a system and method to identify machine emergency types within a 3GPP network/device (covering LTE, 5G, 6G), enrich the emergency messages with appropriate data such as location, machine ID, Plant ID etc.

The present disclosure provides for a system and method to identify the appropriate emergency servers that can handle the type of emergency, redirecting the emergency messages to the appropriate servers along with enriched data.

We claim:

1. A system for detecting and handling machine emergencies in a network, said system comprising:
one or more processors operatively coupled with one or more first computing devices, one or more base stations, an Open radio access network (O-RAN) Radio Unit (RU) and a plurality of nodes, wherein the one or more first computing devices, the one or more base stations, the O-RAN RU and the plurality of nodes are operatively coupled with the network, wherein said one or more processors are coupled with a memory, wherein said memory stores instructions which when executed by the one or more processors causes said system to:
receive a first set of data packets, the first set of data packets pertaining to a plurality of messages from the one or more first computing devices in the network;
receive a second set of data packets, the second set of data packets pertaining to a plurality of messages from the one or more base stations in the network;
receive a third set of data packets, the third set of data packets pertaining to a plurality of messages from the O-RAN RU in the network;
receive a fourth set of data packets, the fourth set of data packets pertaining to a plurality of messages from the plurality of nodes in the network;
extract, by using a machine learning (ML) engine, a set of attributes from the first, second, third and fourth set of received data packets, the set of attributes pertaining to one or more emergencies associated with the one or more first computing devices, the one or more base stations, the O-RAN-RU and the plurality of nodes, wherein the ML engine is associated with the one or more processors, wherein initial bits of the first set of data packets, second set of data packets, third set of data packets and fourth set of data packets indicate an emergency type and rest of the first set of data packets, second set of data packets, third set of data packets and fourth set of data packets indicate packet transfer post the establishment of a machine assembly; and
classify, by the ML engine, the one or more emergencies into a set of predefined classes based on a predefined set of instructions.

2. The system as claimed in claim 1, wherein the ML engine is configured to process and handle the one or more emergencies based on a set of instructions associated with each said predefined class.

3. The system as claimed in claim 2, wherein the ML engine is further configured to define the set of instructions for each said predefined class to handle pre-mapped Industry verticals.

4. The system as claimed in claim 2, wherein the ML engine is further configured to cater for a plurality of real time machine type emergencies that occur in one or more IoT applications.

5. The system as claimed in claim 2, wherein the ML engine is further configured to:
define one or more new emergency types associated with the one or more first computing devices, the one or more base stations, the O-RAN-RU and the plurality of nodes; and
manage and handle the one or more new emergency types in the network.

6. The system as claimed in claim 2, wherein the ML engine is further configured to:
define and categorise the one or more new emergency types as new classes of emergencies.

7. The system as claimed in claim 6, wherein the ML engine is further configured to:
handle each said new emergency type automatically or manually based on the categorization of the one or more new emergency types and a predefined set of instructions associated with the categorization.

8. The system as claimed in claim 6, wherein the ML engine is further configured to:
collect data collected meticulously and deposit in a cloud-based data lake to be processed to extract actionable insights.

9. The system as claimed in claim 6, wherein the ML engine is further configured to:
receive a newly defined quality of service to handle one or more emergencies that is shared in the service request cause;
configure and map the new identified QoS profile and/or handle the emergency appropriately; and
interface and identify the emergency type and the necessary signalling identifiers to let the network know of the right type of QoS profile to identify and apply.

10. A user equipment (UE) for detecting and handling machine emergencies in a network, said UE comprising:
one or more processors operatively coupled with one or more base stations, an Open radio access network (O-RAN) Radio Unit (RU) and a plurality of nodes, wherein the one or more base stations, the ORAN RU and the plurality of nodes are operatively coupled with the network, wherein said one or more processors are coupled with a memory, wherein said memory stores instructions which when executed by the one or more processors causes said system to:
receive a first set of data packets, the first set of data packets pertaining to a plurality of messages from the UE in the network;
receive a second set of data packets, the second set of data packets pertaining to a plurality of messages from the one or more base stations in the network;
receive a third set of data packets, the third set of data packets pertaining to a plurality of messages from the O-RAN RU in the network;
receive a fourth set of data packets, the fourth set of data packets pertaining to a plurality of messages from the plurality of nodes in the network;
extract, by using a machine learning (ML) engine, a set of attributes from the first, second, third and fourth set of received data packets, the set of attributes pertaining to one or more emergencies associated with the UE, the one or more base stations, the O-RAN-RU and the plurality of nodes, wherein the ML engine is associated with the one or more processors, wherein initial bits of the first set of data packets, second set of data packets, third set of data packets and fourth set of data packets indicate an emergency type and rest of the first set of data packets, second set of data packets, third set of data packets and fourth set of data packets indicate packet transfer post the establishment of a machine assembly; and classify, by the ML engine, the one or more emergencies into a set of predefined classes based on a predefined set of instructions.

11. A method for detecting and handling machine emergencies in a network, said method comprising:

receiving, by one or more processors, a first set of data packets, the first set of data packets pertaining to a plurality of messages from one or more first computing devices in the network, wherein the one or more processors operatively coupled with the one or more first computing devices, one or more base stations, an Open radio access network (O-RAN) Radio Unit (RU) and a plurality of nodes, wherein the one or more first computing devices, the one or more base stations-, the O-RAN RU and the plurality of nodes are operatively coupled with the network, wherein said one or more processors arc coupled with a memory, wherein said memory stores instructions which are executed by the one or more processors;

receiving, by the one or more processors, a second set of data packets, the second set of data packets pertaining to a plurality of messages from the one or more base stations in the network;

receiving, by the one or more processors, a third set of data packets, the third set of data packets pertaining to a plurality of messages from the O-RAN RU) in the network;

receiving, by the one or more processors, a fourth set of data packets, the fourth set of data packets pertaining to a plurality of messages from the plurality of nodes in the network;

extracting, by the ML engine, a set of attributes from the first, second, third and fourth set of data packets received, the set of attributes pertaining to one or more emergencies associated with the one or more first computing devices, the one or more base stations, the O-RAN-RU and the plurality of nodes, wherein initial bits of the first set of data packets, second set of data packets, third set of data packets and fourth set of data packets indicate an emergency type and rest of the first set of data packets, second set of data packets, third set of data packets and fourth set of data packets indicate packet transfer post the establishment of a machine assembly; and classifying, by the ML engine, the one or more emergencies into a set of predefined classes based on a predefined set of instructions.

12. The method as claimed in claim 11, wherein the method further comprises the step of:
collecting, by the ML engine, data collected meticulously and deposit in a cloud-based data lake to be processed to extract actionable insights.

13. The method as claimed in claim 11, wherein the method further comprises the step of: processing and handling by the ML engine, the one or more emergencies based on a set of instructions associated with each said predefined class.

14. The method as claimed in claim 13, wherein the method further comprises the step of: defining, by the ML engine, the set of instructions for each said predefined class to handle pre-mapped industry verticals.

15. The method as claimed in claim 13, wherein the method further comprises the step of:
catering, by the ML engine, for a plurality of real time machine type emergencies that occur in one or more IoT applications.

16. The method as claimed in claim 13, wherein the method further comprises the step of:
defining, by the ML engine, one or more new emergency types associated with the one or more first computing devices, the one or more base stations, the O-RAN-RU and the plurality of nodes; and
managing and handling, by the ML engine, the one or more new emergency types in the network.

17. The method as claimed in claim 16, wherein the method further comprises the step of: defining and categorizing, by the ML engine, the one or more new emergency types as new classes of emergencies.

18. The method as claimed in claim 17, wherein the method further comprises the step of: handling, by the ML engine, each said new emergency type automatically or manually based on the categorization of the one or more new emergency types and a predefined set of instructions associated with the categorization.

19. The method as claimed in claim 13, wherein the method further comprises the step of:
receiving, by the ML engine, a newly defined quality of service (QoS) to handle one or more emergencies that is shared in the service request cause;
configuring and mapping, by the ML engine, the new identified QoS profile and/or handle the emergency appropriately; and
interfacing and identifying, by the ML engine, the emergency type and the necessary signalling identifiers to let the network know of the right type of QoS profile to identify and apply.

* * * * *